United States Patent
Rutherford et al.

(10) Patent No.: US 8,619,380 B1
(45) Date of Patent: Dec. 31, 2013

(54) DETECTING AND RECOVERING TIMING SLIPS IN A SELF SERVO WRITE (SSW) SYSTEM

(75) Inventors: David Rutherford, San Jose, CA (US); Man Cheung, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/618,869

(22) Filed: Sep. 14, 2012

Related U.S. Application Data

(63) Continuation of application No. 12/539,474, filed on Aug. 11, 2009, now Pat. No. 8,284,510.

(60) Provisional application No. 61/089,690, filed on Aug. 18, 2008.

(51) Int. Cl.
*G11B 5/09* (2006.01)
*G11B 21/02* (2006.01)

(52) U.S. Cl.
USPC .............................................. 360/51; 360/75

(58) Field of Classification Search
None
See application file for complete search history.

(56) References Cited

U.S. PATENT DOCUMENTS

| | | | |
|---|---|---|---|
| 7,378,810 B1 * | 5/2008 | Sutardja et al. | 318/268 |
| 7,460,326 B1 * | 12/2008 | Sutardja | 360/75 |
| 2004/0125488 A1 * | 7/2004 | Zhu et al. | 360/75 |
| 2006/0044664 A1 | 3/2006 | Itagaki et al. | |
| 2006/0209449 A1 * | 9/2006 | Ehrlich | 360/75 |

OTHER PUBLICATIONS

IEEE P802.11g/D8.2, Apr. 2003, Draft Supplement to Standard [for] Information Technology:—Telecommunications and information exchange between systems,—Local and metropolitan area networks-Specific requirements,—Part 11: Wireless LAN Medium Access Control (MAC) and Physical Layer (pHY) specifications: Further Higher Data Rate Extension in the 2.4 GHz Band, Apr. 2003, pp. 1-69, The Institute of Electrical and Electronics Engineers, Inc., New York, NY, USA.

IEEE Std 802.11 b-1999, Part 11: Wireless LAN Medium Access Control (MAC) and Physical Layer (PHY) specifications: Higher-Speed Physical Layer Extension in the 2.4 GHz Band, Sep. 16, 1999, pp. 1-96, The D Institute of Electrical and Electronics Engineers, Inc., New York, NY, USA.

* cited by examiner

*Primary Examiner* — Daniell L Negron

(57) ABSTRACT

Embodiments of the present disclosure provide a method including recording time stamps for a repeating characteristic of a spindle back electromotive force (BEMF) signal and comparing one or more of the recorded time stamps for the repeating characteristic of the spindle BEMF signal with an expected value for the one or more recorded time stamps to detect a timing error associated with writing a servo pattern on a machine readable medium of a self-servo write (SSW) system. Other embodiments may be described and/or claimed.

15 Claims, 5 Drawing Sheets

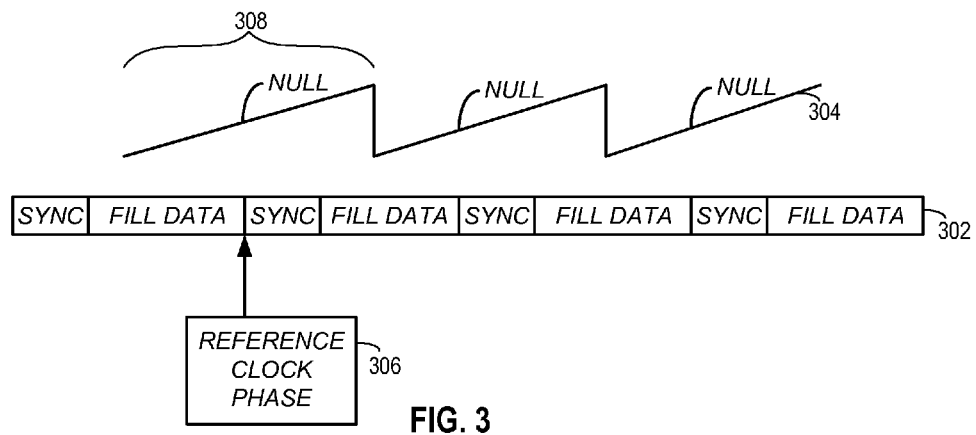
FIG. 3
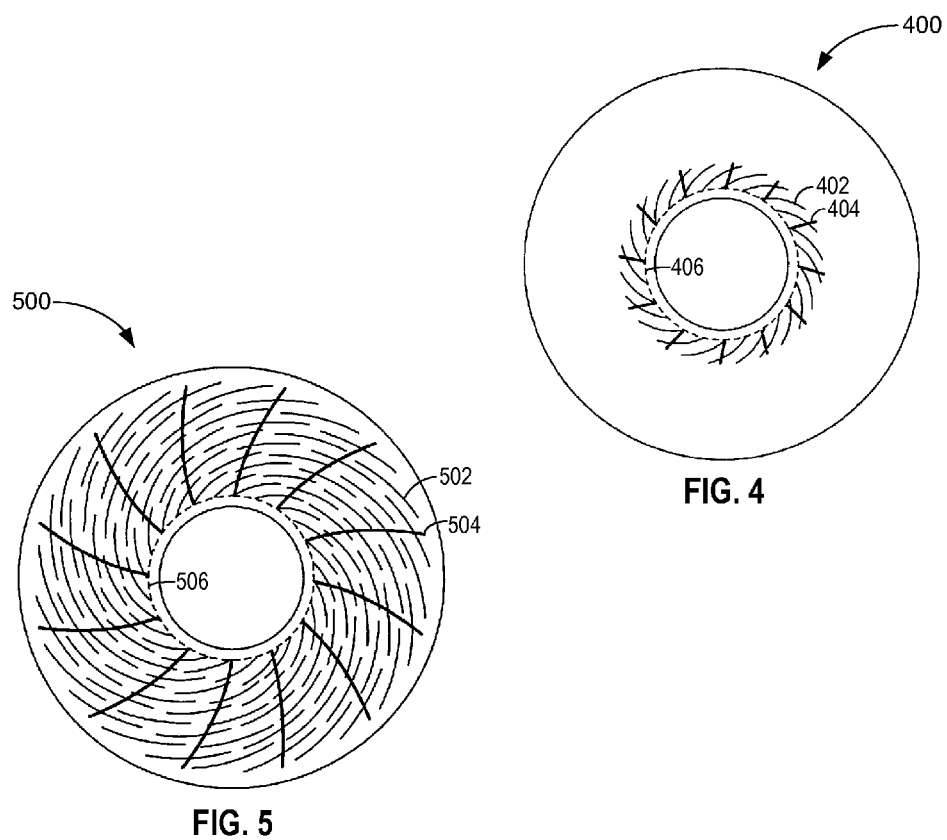
FIG. 4
FIG. 5

DETECTING AND RECOVERING TIMING SLIPS IN A SELF SERVO WRITE (SSW) SYSTEM

CROSS REFERENCE TO RELATED APPLICATIONS

The present disclosure is a continuation of and claims priority to U.S. patent application Ser. No. 12/539,474, filed Aug. 11, 2009, entitled "Detecting and Recovering Timing Slips in a Self Servo Write (SSW) System," which claims priority to U.S. Provisional Patent Application No. 61/089,690, filed Aug. 18, 2008, entitled "An Apparatus to Detect and Recover SSW Timing Slips in Spiral Servo," which are incorporated herein by reference.

TECHNICAL FIELD

Embodiments of the present invention relate to storage devices, and more particularly, to disk drives.

BACKGROUND

A disk drive is a common data storage device. For example, in magnetic-medium-based storage devices, data is typically stored on circular, concentric tracks on a magnetic disk surface. A read-write head retrieves and records data on the magnetic layer of a rotating disk. When retrieving data, magnetic field variations are converted into an analog signal that is amplified and converted to a digital signal for interpretation. Servo information may be embedded on the recording surface to guide a servo control in accurately positioning the head for read/write purposes. For example, the servo information may define the position of the data tracks.

Traditionally, a servo writer machine is used to write the embedded servo information on the disk surface. Present servo writers are typically large and expensive, and as the typical track density increases, the servo writing time also increases, which can create a constraint in the disk drive manufacturing process at the servo writer station. Self-servo write (SSW) systems are emerging to perform functions of the servo writer machines. SSW systems include hard disk drives that are configured to write the servo information for timing and/or positioning in-situ. Such SSW systems may reduce costs associated with external servo writers.

A timing transient may occur while the SSW system is writing embedded servo information on the disk surface, which may result in a jump in decoded position or a gap or squeeze in the embedded servo information. Techniques and supporting configurations are needed to detect and recover timing slips in SSW systems to provide accurate embedded servo information for reading and writing data on the disk.

SUMMARY

The present disclosure provides a method including recording time stamps for a repeating characteristic of a spindle back electromotive force (BEMF) signal, and comparing one or more of the recorded time stamps for the repeating characteristic of the spindle BEMF signal with an expected value for the one or more recorded time stamps to detect a timing error associated with writing a servo pattern on a machine readable medium of a self-servo write (SSW) system.

According to various embodiments, the timing error is detected when a variation between the one or more recorded time stamps and the expected value for the one or more recorded time stamps exceeds a predetermined threshold.

According to various embodiments, the method further includes latching the recorded time stamps using a reference clock controlled by a phase locked loop (PLL) that locks the reference clock to the servo pattern on the machine readable medium.

According to various embodiments, the method further includes correcting the timing error.

According to various embodiments, correcting the timing error comprises applying a timing correction to a reference clock locked to the servo pattern on the machine readable medium to undo the timing error.

According to various embodiments, correcting the timing error comprises re-starting a phase locked loop (PLL) that locks a reference clock to the servo pattern on the machine readable medium, and re-aligning the timing for writing the servo pattern by using a sync mark of a successfully written servo pattern on the machine readable medium.

The present disclosure further provides an apparatus having a controller configured to control a spindle of a self-servo write (SSW) system, and a SSW module communicatively coupled with the controller and configured to record time stamps for a repeating characteristic of a back electromotive force (BEMF) signal received from the controller and configured to compare one or more of the recorded time stamps for the repeating characteristic of the spindle BEMF signal with an expected value for the one or more recorded time stamps to detect a timing error associated with writing a servo pattern on a machine readable medium of the self-servo write (SSW) system.

According to various embodiments, the timing error is detected when a variation between the one or more recorded time stamps and the expected value for the one or more recorded time stamps exceeds a predetermined threshold.

According to various embodiments, the apparatus further includes a reference clock configured to latch the recorded time stamps and controlled by a phase locked loop (PLL) that is configured to lock the reference clock to the servo pattern on the machine readable medium.

According to various embodiments, the SWW module is further configured to correct the timing error by applying a timing correction to the reference clock to undo the timing error.

According to various embodiments, the SWW module is further configured to correct the timing error by re-starting the phase locked loop (PLL) and re-aligning the timing for writing the servo patterns by using a sync mark of a written servo pattern on the machine readable medium.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 3 schematically illustrates a method of embedding timing information into a spiral servo pattern and the linearity characteristics of the associated phase error.

FIGS. 4-5 schematically illustrate an example disk after a spiral-based positioning pattern and a final positioning pattern have been written at various phases.

DETAILED DESCRIPTION OF EMBODIMENTS OF THE INVENTION

Embodiments of the present invention describe configurations and techniques to detect timing slips in a self-servo write (SSW) system. In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

As used herein, the term module refers to an Application Specific Integrated Circuit (ASIC), an electronic circuit, a processor (e.g., shared, dedicated, or group) and memory that execute one or more software or firmware programs, a combinational logic circuit, and/or other suitable components that provide the described functionality.

Figure 1:
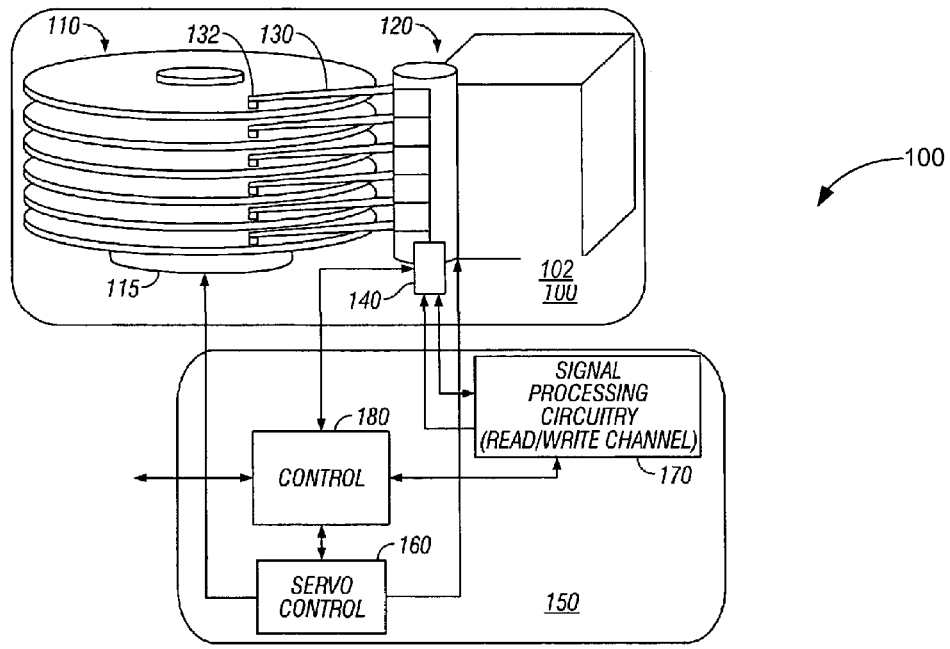
FIG. 1 schematically illustrates an example self-servo write (SSW) system.

FIG. 1 schematically illustrates an example self-servo write (SSW) system 100. SSW system 100 includes a head-disk assembly (HDA) 102 and drive electronics 150 (e.g., a printed circuit board assembly with semiconductor devices). The HDA 102 includes one or more disks 110 mounted on an integrated spindle and motor assembly 115. The spindle and motor assembly 115 rotates the disk(s) 110 under read-write head(s) connected with a head assembly 120 in the HDA 102. The disk(s) 110 are generally coated with a magnetically hard material (e.g., a particulate surface or a thin-film surface) and can be written to, or read from, on a single side or both sides of each disk.

A head 132 on an actuator arm 130 is configured to read/write data on the disk. A motor, such as a voice coil motor (VCM), may be used to position the head 132 over a desired track. The actuator arm 130 may be a pivoting or sliding arm and may be spring-loaded to maintain a proper flying height for the head 132 in any drive orientation. A closed-loop head positioning system may be used.

The HDA 102 generally includes a preamp/writer 140, where head selection and sense current value(s) may be set. The preamp/writer 140 may amplify, for example, a read signal before outputting it to signal processing circuitry 170. The signal processing circuitry 170 generally includes, for example, a read signal circuit, a servo signal processing circuit, and a write signal circuit.

Signals between the HDA 102 and the drive electronics 150 are generally carried, for example, by a flexible printed cable, or other suitable means for interconnect. A controller 180 is configured to direct a servo controller 160 to control mechanical operations, such as head 132 positioning through the head assembly 120 and rotational speed control through the motor assembly 115. The servo controller 160 may comprise, for example, spindle controller 202 and/or self-servo write module 204, described further with respect to FIG. 2a. The controller 180 may comprise one or more integrated circuit (IC) chips (e.g., a combination chip), which may include read/write channel (e.g., signal processing circuitry 170). For example, the controller 180 may be a hard disk controller comprising one or more processors. The drive electronics 150 may include various interfaces, such as a host interface, and memory devices, such as a read only memory (ROM) for use by a processor, and a random access memory (RAM) for use by a hard disk controller. The read/write channel (e.g., signal processing circuitry 170) may include error correction circuitry.

According to various embodiments, the SSW module 204 causes servo information to be written on the machine-readable medium as described herein. The SSW module 204 may be integrated into a device, such as a read/write channel transceiver device (e.g., the signal processing circuitry 170). The SSW module 204 may be composed of multiple sets of coordinating circuitry and can be integrated with the components described above or organized into a separate component of a disk drive. For example, the SSW module 204 may be integrated into the controllers 160, 180, the read/write channel (e.g., the signal processing circuitry 170), the preamp/writer 140, or various combinations of these components (e.g., the components 160, 170, 180 may be combined into a single integrated circuit).

Figure 2A:
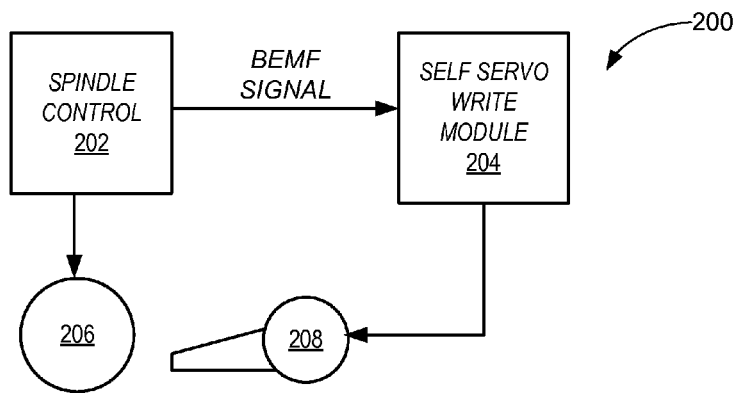
FIG. 2a schematically illustrates a configuration of SSW components of a SSW system to detect and recover timing slips.

FIG. 2a schematically illustrates a configuration of components of a SSW system to detect and recover timing slips. In an embodiment, the configuration 200 includes the spindle controller 202 communicatively coupled with the SSW module 204, as illustrated. Such configuration 200 may be part of drive electronics 150 described with respect to FIG. 1.

Spindle controller 202 is configured to control a spindle 206 (e.g., part of motor and spindle assembly 115) of the SSW system 100. Spindle 206 is configured to provide a spinning axle on which platters or disk(s) 110 are mounted. In an embodiment, spindle controller 202 is configured to output a signal associated with back electromotive force (BEMF). The spindle BEMF signal may be received, sampled, and time-stamped by the SSW module 204. A time stamp includes a recorded digital reading of a reference clock within the SSW module 204. The reference clock is also referred to as a SSW clock (SSWCLK) herein. The SSW clock may be a high resolution clock to allow timing error recovery where a time slip can be measured using the spindle BEMF signal time-stamps and be undone. The SSW clock is further described with respect to at least FIG. 6.

Figure 2B:
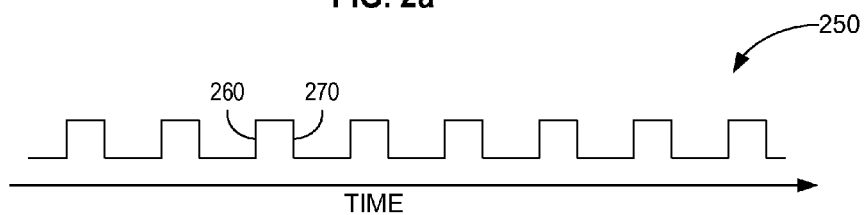
FIG. 2b schematically illustrates an example back electromotive force (BEMF) signal.

The SSW module 204 may be configured to record time stamps for a repeating characteristic of the spindle BEMF signal received from the spindle controller 202. Referring briefly to FIG. 2b, in an embodiment, the spindle BEMF signal 250 comprises a digital signal and the repeating characteristic comprises a zero crossing of the spindle BEMF signal 250 that is sampled, for example, at a rising 260 or falling 270 edge of the spindle BEMF signal 250. The zero crossing repeats n times per revolution of the spindle 206, where n is determined by a variety of factors including, for example, a number of spindle poles and/or the driving method employed.

Zero crossings of the spindle BEMF signal 250 associated with each spindle phase may have a varying expected value over time. The SSW module 204 is configured to compare one or more of the recorded time stamps for the zero crossings of the spindle BEMF signal 250 with an expected value for the one or more recorded time stamps to detect a timing error (e.g., a timing error associated with writing a servo pattern on a machine readable medium of the SSW system 100). For example, a table for the differences between one or more of the recorded and expected values for the zero crossings may be maintained where a difference greater than a threshold value indicates that a timing error is detected. The threshold value may be a predetermined threshold.

In an embodiment, a predetermined variation between the expected value and the recorded value over a predetermined number of zero crossings of the spindle BEMF signal 250 is used to signify a timing slip. In an embodiment, the predetermined number of zero crossings is about six. Other predetermined numbers of zero crossings may be used in other embodiments.

Measurement of the spindle BEMF signal 250 may vary. Variation in the timing of the spindle BEMF signal 250 may be caused, for example, by error in the detection of the zero crossing. Thus, the predetermined threshold may need to account for variation in the timing of the spindle BEMF signal 250 caused by error in the detection of the zero crossing. Error in the detection of the zero crossing may vary, for example, according to magnetic properties of the spindle 206, and/or the zero crossing detection method employed in the spindle controller 202. Such error in detection of the zero crossing generally provides a lower limit to the amount of timing slip that is detectable.

The SSW module 204 may be further configured to correct the detected timing error. Recovery from the timing error may be accomplished in a variety of ways. In an embodiment, the SSW module 204 is configured to apply a timing offset or correction to the SSW clock to undo the timing error. In other embodiments, the SSW module 204 is configured to re-start timing associated with writing a servo pattern, and re-align the timing for writing servo patterns by using a synchronization mark, also referred to as "sync" mark, of a written servo pattern on the machine readable medium. Some amount of the servo pattern which was written prior to the timing slip may be re-written to achieve an accurately positioned servo pattern without detrimental squeeze or gap.

The SSW module 204 may be further configured to control an actuator 208. Actuator 208 may be part of head assembly 120 to drive actuator arm 130 and, thus, head 132. In an embodiment, SSW module 204 is configured to write a spiral-based positioning pattern on a platter or disk 110, wherein the spiral-based positioning pattern is configured to control the actuator 208 while a final positioning pattern is written on the platter. For example, the SSW clock of SSW module 204 that is configured to latch the recorded time stamps for the spindle BEMF signal 250 may be controlled by a phase locked loop (PLL) that is configured to lock the reference clock to the servo pattern, such as the spiral-based positioning pattern. Time stamps of sync marks within the spiral-based positioning pattern may be used to provide timing information for the PLL to control the SSW clock to provide a clock reference. Such timing scheme may be implemented, for example, when a clock track is not used on the disk.

FIG. 3 schematically illustrates an example servo pattern 302 and phase error signal 304 from a timing perspective. Servo pattern 302 may represent a spiral-based pattern having four frames. The servo pattern 302 may include more or fewer frames in other embodiments.

Each frame of the servo pattern 302 may comprise a frame synchronization mark (SYNC), which may be created with a simple digital character, followed by a constant frequency pattern (FILL DATA). Phase error signal 304 is representative of a signal that may be generated by an open loop PLL. Reference clock phase 306 represents a set point for the PLL associated with a null. The null may appear once for each frame, as illustrated, owing to the piecewise continuous nature of the phase error signal 304. The PLL may be configured to return to the null associated with the continuous, constant slope portion (e.g., portion 308) of the phase error signal 304 for any timing slips that occur within this portion (e.g., portion 308). The continuous, constant slope portion (e.g., portion 308) may span a distance associated with a single frame, although it may overlap different frames, as illustrated.

From a timing perspective, the frames may be identical. For example, the PLL may not distinguish one frame from another, which may result in the PLL locking onto the wrong null. For example, a transient in the timing may occur that exceeds a frame and the PLL may lock onto a null associated with a sync mark/fill data reference clock phase for a different frame, which may result in a jump in the perceived position error. The PLL may null out the perceived position error and end up in a different frame, resulting in a gap or squeeze in the servo pattern. When a transient in the timing occurs which results in the PLL locking onto another null (e.g., the wrong null), recorded time stamps for the spindle BEMF signal 250 may shift by an amount to indicate detection of the PLL slippage to allow recovery from the timing error and correction of the squeeze or gap.

In an embodiment, the null, or information derived from the null, is compared with one or more recorded time stamps of the spindle BEMF signal to determine whether a predetermined threshold is exceeded to indicate detection of a timing error. Such use of the null, or information derived from the null, may be analogous to that of the expected value of one or more recorded time stamps of the spindle BEMF signal described with respect to FIG. 2.

A self-servo write process may include extracting timing and position information from the spiral-based positioning pattern (e.g., tracks) to provide a positioning signal for writing the final positioning pattern. An analog signal obtained by tracking on the spiral-based positioning pattern may be demodulated and presented in a demodulation window. The positioning information may be derived from a location of a peak in the demodulation window. The location of the peak in the demodulation window may be derived from timing recovered from the PLL locked to the spiral-based positioning pattern. Because the location of the demodulation window is a function of recovered timing, timing slips by the PLL may be interpreted as a shift in position although actual position does not change.

Thus, for a given radial position of the disk or spindle, the location of the peak in the demodulation window may be fixed. As the radial position changes, the timing system may advance the location of the peak in the demodulation window. The position error signal may be created by measuring the difference between the center of the peak in the demodulation window and the current peak time of the spiral-based positioning pattern, which may be further translated into distance based on the geometry of the spiral.

In an embodiment, the timing error results from a failure of the PLL to correctly identify a frame of the spiral-based positioning pattern after a timing transient, wherein the PLL locks a reference clock to the spiral-based positioning pattern. Timing errors or slips, such as slippage of the PLL, may occur due to external shock, imperfect spiral set switching, defects, and/or noise spikes in the timing signals. Subject matter is not limited in this regard and timing errors may include timing errors from other causes.

FIGS. 4-5 schematically illustrate an example disk after a spiral-based positioning pattern and a final positioning pattern have been written at various phases. In an embodiment, the SSW system 100 is configured to create a spiral-based positioning pattern (e.g., 402, 502) on a disk or platter (e.g., 400, 500) and servo on the spiral-based positioning pattern to write a final positioning pattern (e.g., 404, 504) on the disk or platter.

FIG. 4 schematically illustrates a disk after a timing track 406, a first portion of a spiral-based positioning pattern 402, and a first portion of a final positioning pattern 404 are written. The spiral-based positioning pattern 402 is used to provide the position and/or timing reference for self-servo writing of the final positioning pattern 404. For example, the spiral-based positioning pattern 402 may be used to control the actuator 208 while the final positioning pattern 404 is written.

The first portion of spiral-based positioning pattern 402 may support writing of the final positioning pattern 404 to cover a radial range spanned by the spiral-based positioning pattern 402. Then, a second portion of spiral-based positioning pattern (not shown in FIG. 4), such as ramp tracks, may be written with a starting radius located on one of the written patterns to serve as a starting position. The second portion of spiral-based positioning pattern may be used to extend the first portion of the final positioning pattern 404 to a radial edge of the second portion. This process may be continued until the disk 500 is fully written as illustrated with respect to FIG. 5.

Subject matter is not limited in this regard and servo patterns of the SSW system 100 may be created on a disk according to other techniques in other embodiments. Electronics that perform these SSW writing processes may be included in electronics that support normal drive operation, such that a disk drive can perform self-servo write and self-test without the aid of additional hardware outside the HDA 102 and drive electronics 150.

Figure 6:
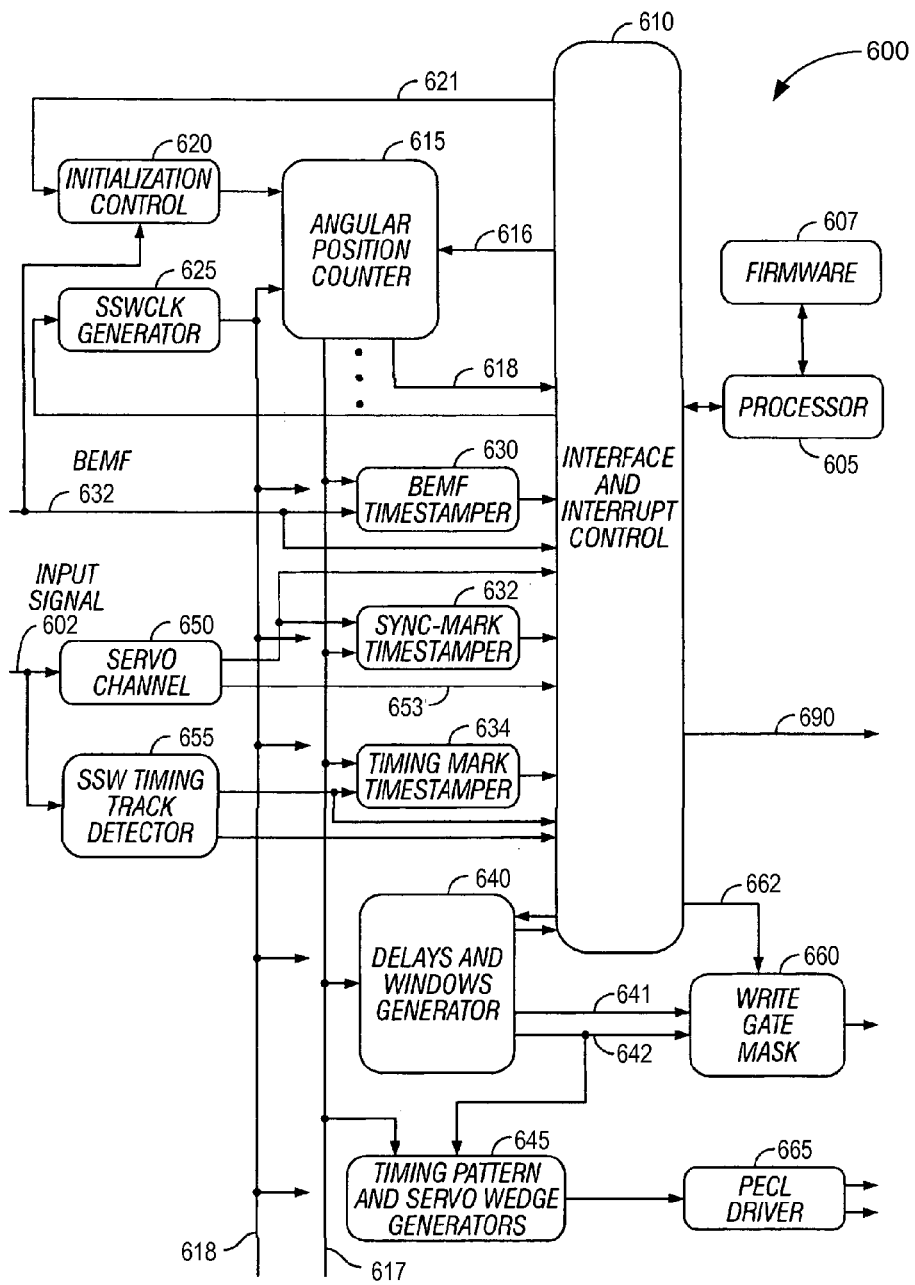
FIG. 6 is a block diagram of an example configuration for a SSW controller.

FIG. 6 is a block diagram of an example configuration for a SSW controller 600. A processor 605 is configured to perform computations as needed using software or firmware 607. The software or firmware 607 may be stored on a machine-readable storage medium. An interface and interrupt control 610 provides an interface between the processor 605 and other components of the SSW controller 600. SSW module 204 may comport with embodiments of SSW controller 600 and may include more or fewer components than described.

An angular position counter 615 receives counter parameters on a line 616 and provides an index pulse on a line 618, both coupled to the interface and interrupt control 610. The angular position counter 615 also provides an angular position value on a line 617. Additional similar counters may be included in the SSW controller 600.

An initialization control 620 receives an index initialization on a line 621 and receives BEMF pulses on a line 632 (e.g., from the spindle controller 202). A SSW clock (SSWCLK) generator 625 may be controlled by the processor 605 and provides a clock signal to an SSWCLK line 618. Multiple counters (e.g., 615) may be clocked by SSWCLK, running synchronously to the disk, and may be used to define the angular position of the recording disk. The counters (e.g., 615) may be programmed to have a complete period covering one revolution of the disk.

A spindle BEMF timestamper 630 measures the BEMF edges in terms of the angular position defined by the synchronous counter(s) (e.g., 615), providing the location information of the BEMF pulses consistent with the angular position used by the SSW processes. The spindle BEMF timestamper 630 may be configured to time-stamp zero crossings of the spindle BEMF signal.

A signal from the read head is received on a line 602 and provided to a servo channel 650 and a SSW timing track detector 655. The servo channel 650 provides servo position error demodulation values to the interface and interrupt control 610 on a line 653. The servo channel 650 also provides a servo mark detect signal to the interface and interrupt control 610 and to a sync mark timestamper 632. The servo mark detect signal may be used to detect the location of sync-marks from servo patterns, such as the final positioning pattern 504, which may include servo wedges.

A timing mark timestamper 634 is used to detect the location of timing marks relative to the rotation angle. The SSW timing track detector 655 provides timing mark type information to the interface and interrupt control 610 and also timing mark defect information to both the interface and interrupt control 610 and the timing mark timestamper 634.

A delays and windows generator 640 interacts with the interface and interrupt control 610, a write gate mask 660, and a timing pattern and servo wedge generator(s) 645. Target values are provided from the interface and interrupt control 610 to the delays and windows generator 640, and timing and window pulses are provided from the delays and windows generator 640 to the interface and interrupt control 610. Additionally, a signal associated with a servo pattern, such as a spiral-based positioning pattern 502 is provided on a line 641 and a signal associated with a servo pattern, such as final positioning pattern 504, is provided on a line 642.

The write gate mask 660 receives a write mask enable signal on a line 662. The write gate mask 660 may include a write enable circuit with programmable turn-on and turn-off time relative to disk angular position, such as defined by the counter(s), and also a write protect circuit tied to a wedge window period. If enabled, the write protect circuit disables writing to the disk even during the write-enable period defined by the write enable circuit. Output of the write gate mask 660 may be provided to a preamp control. Additionally, output of a positive emitter coupled logic (PECL) driver 665 may be provided to preamp write input pins.

Figure 7:
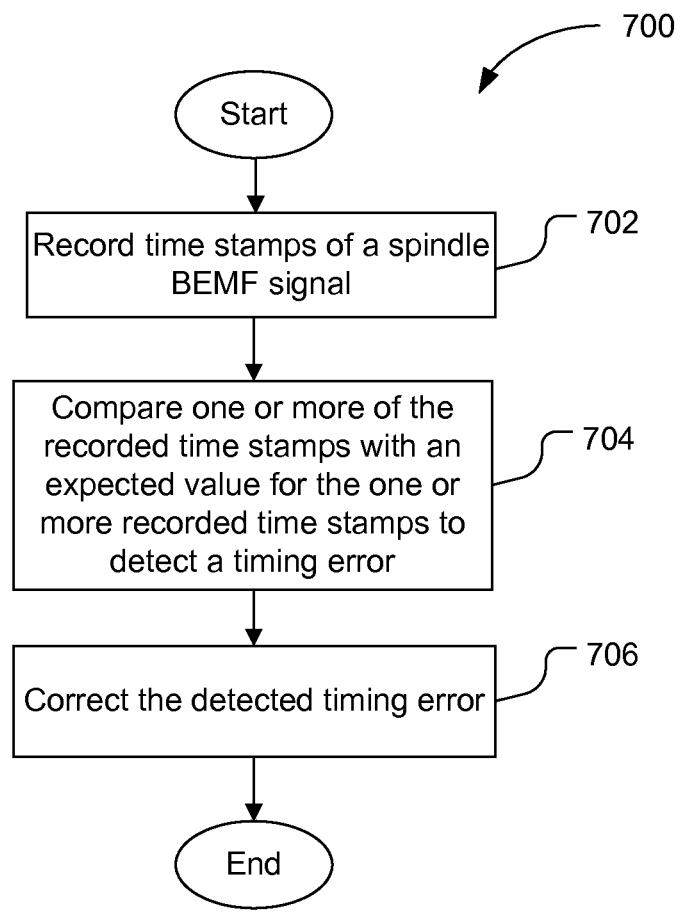
FIG. 7 is a flow diagram of a method to detect a timing slip and recover from the timing slip.

FIG. 7 is a flow diagram of a method to detect a timing slip and recover from the timing slip. Method 700 includes recording time stamps of a spindle BEMF signal, at block 702, comparing one or more of the recorded time stamps with an expected value for the one or more recorded time stamps to detect a timing error, at block 704, and correcting the timing error, at block 706.

At block 702, the spindle BEMF signal includes a digital signal. Time stamps of a repeating characteristic of the spindle BEMF signal are recorded. In an embodiment, the repeating characteristic includes a zero crossing of the spindle BEMF signal. Recording time stamps may further include latching the recorded time stamps using a reference clock (e.g., SSW clock) controlled by a phase locked loop (PLL) that locks the reference clock to the servo pattern on the machine readable medium.

At block 704, the timing error may be detected when a variation between the one or more recorded time stamps and the expected value for the one or more recorded time stamps exceeds a predetermined threshold. The SSW module 204 is configured to compare one or more of the recorded time stamps for the zero crossings of the spindle BEMF signal with an expected value for the one or more recorded time stamps to detect a timing error (e.g., a timing error associated with writing a servo pattern on a machine readable medium of the SSW system 100). For example, a table for the differences between one or more of the recorded and expected values for the zero crossings may be maintained where a difference greater than a threshold value indicates that a timing error is detected. The threshold value may be a predetermined threshold.

Zero crossings of the spindle BEMF signal associated with each spindle phase may have a varying expected value over time. In an embodiment, a predetermined variation between the expected value and the recorded value over a predetermined number of zero crossings of the spindle BEMF signal is used to signify a timing slip. Measurement of the spindle BEMF signal may vary. Variation in the timing of the spindle BEMF signal may be caused, for example, by error in the detection of the zero crossing. Thus, the predetermined threshold may need to account for variation in the timing of the spindle BEMF signal caused by error in the detection of the zero crossing. Error in the detection of the zero crossing may vary, for example, according to magnetic properties of the spindle 206 motor, and/or the zero crossing detection method employed in the spindle controller 202. Such error in detection of the zero crossing may provide a lower limit to the amount of timing slip that is detectable. In an embodiment, the predetermined number of zero crossings is about six. Other predetermined numbers of zero crossings may be used in other embodiments.

The timing error may include slippage of the PLL. For example, a SSW process may include writing a spiral-based positioning pattern on a platter of a SSW system, wherein the spiral-based pattern is configured to control an actuator of the SSW system while a final positioning pattern is written on the platter. The timing error may result from a failure of the PLL to correctly identify a frame of the spiral-based positioning pattern after a timing transient, wherein the PLL locks a reference clock (e.g., SSW clock) to the spiral-based positioning pattern.

At block 706, correcting the timing error includes a variety of techniques. In an embodiment, the timing error is corrected by applying a timing correction to the reference clock locked to the servo pattern on the machine readable medium to undo the timing error. For example, if the PLL time slip can be measured accurately with a higher resolution BEMF time stamp, a correction to the PLL reference clock may be applied to "re-wind" the slippage. In another embodiment, the timing error is corrected by re-starting the PLL that locks the reference clock to the servo pattern and re-aligning the timing for writing the servo pattern by using a sync mark of a successfully written servo pattern on the machine readable medium. For example, the PLL may be re-started based on written sync marks of the spiral-based and/or final positioning patterns to re-align the SSW timing. Some amount of the final positioning pattern written prior to the timing slip may need to be re-written to achieve a final servo pattern with no squeeze or gaps.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 8:
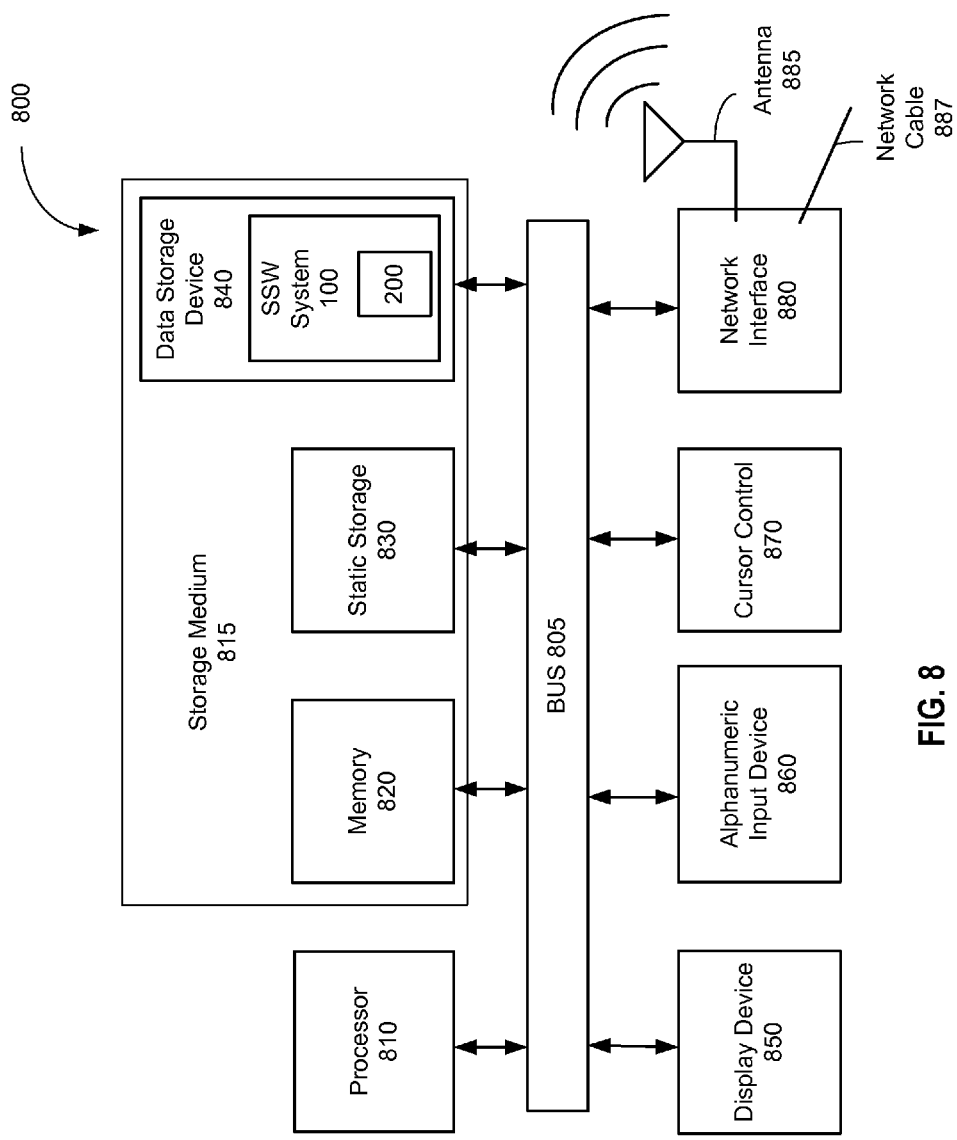
FIG. 8 is a schematic diagram of an electronic system for implementing a SSW configuration and techniques described herein, in accordance with various embodiments of the present invention.

FIG. 8 is a schematic diagram of an electronic system for implementing a SSW configuration and techniques described herein, in accordance with various embodiments of the present invention. Electronic system 800 may comport with embodiments already described herein. Electronic system 800 is intended to represent a variety of electronic devices (either wired or wireless) including, for example, desktop computer devices, laptop computer devices, personal computers (PC), telephones, personal digital assistants (PDA) including cellular-enabled PDAs, set top boxes, pocket PCs, tablet PCs, DVD players, video players, or servers, but is not limited to these examples and may include other electronic devices. Alternative electronic systems may include more, fewer and/or different components.

Electronic system 800 includes bus 805 or other communication device or interface to communicate information, and processor 810 coupled to bus 805 that may process information. Bus 805 may be a single system bus or a number of buses of the same or different types bridged together. System 800 may include one or more processors and/or co-processors.

System 800 also includes a storage medium 815, which may include various types of storage (e.g., memory 820, static storage 830, and data storage device 840), coupled to bus 805 to store information and/or instructions that may be processed and/or executed by processor 810. Storage medium 815 may include more or less types of storage than depicted according to various embodiments.

In an embodiment, an article of manufacture is disclosed. The article of manufacture includes a storage medium 815 or other computer-readable medium having instructions stored thereon that, if executed, result in the actions described herein. In an embodiment, instructions to implement or perform actions described herein are stored in storage medium 815. The instructions may be in the form of firmware or software according to various embodiments.

In an embodiment, system 800 includes random access memory (RAM) or other storage device 820 (may be referred to as "memory"), coupled to bus 805. Memory 820 may also be used to store temporary variables or other intermediate information during execution of instructions by processor 810. Memory 820 may include a flash memory device.

System 800 also includes read only memory (ROM) and/or other static storage device 830 coupled to bus 805 to store static information and instructions for processor 810. Data storage device 840 may be coupled to bus 805 to store information and instructions. Data storage device 840 may include a magnetic hard disk drive (HDD). According to various embodiments, data storage device 840 includes a SSW system 100 having a configuration 200 as described herein to detect timing slips and correct them.

Electronic system 800 is coupled via bus 805 to display device 850, such as a cathode ray tube (CRT) or liquid crystal display (LCD), to display information to a user. Alphanumeric input device 860, including alphanumeric and other keys, may be coupled to bus 805 to communicate information and command selections to processor 810. Cursor control 870 may be another type of input device and may include, for example, a mouse, a trackball, or cursor direction keys to communicate information and command selections to processor 810 and to control cursor movement on display 850.

Electronic system 800 further includes one or more network interfaces 880 to provide access to network 820, such as a local area network, but is not limited in this regard. Network interface 880 may include, for example, a wireless network interface having antenna 885, which may represent one or more antennae. Network interface 880 may also include, for example, a wired network interface to communicate with remote devices via network cable 887, including, for example, an Ethernet cable, a coaxial cable, a fiber optic cable, a serial cable, or a parallel cable.

In one embodiment, network interface 880 provides access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
while writing a servo pattern on a machine readable medium rotating about a spindle,
    i) recording, over time, a plurality of time stamps associated with a characteristic of a back electromotive force signal generated as the machine readable medium rotates about the spindle, wherein the characteristic of the back electromotive force signal repeats over the time that the plurality of time stamps are recorded, and wherein the characteristic of the back electromotive force signal is expected to repeat at expected times over the time that the plurality of time stamps are recorded,
    ii) performing a comparison of one or more of the plurality of time stamps with one or more of the expected times that the characteristic of the back electromotive force signal is expected to repeat,
    iii) based upon the comparison, detecting a timing error associated with writing the servo pattern on the machine readable medium, and
    iv) based on the timing error, re-writing at least a part of the servo pattern that was previously written on the machine readable medium.

2. The method of claim 1, wherein detecting the timing error comprises detecting when a variation between (i) the one or more of the plurality of time stamps and (ii) the one or more of the expected times that the characteristic of the back electromotive force signal is expected to repeat exceeds a predetermined threshold.

3. The method of claim 1, wherein:
recording the plurality of time stamps comprises latching the plurality of time stamps using a reference clock controlled by a phase locked loop.

4. The method of claim 1, further comprising:
applying, based on the timing error, a timing correction to a reference clock locked to the servo pattern on the machine readable medium.

5. The method of claim 1, wherein writing the servo pattern on the machine readable medium comprises:
writing a spiral-based positioning pattern on a platter, wherein the spiral-based positioning pattern is configured to control an actuator while a final positioning pattern is written on the platter.

6. A self-servo write controller configured to control a spindle of a self-servo write system, the self-servo write controller comprising a self-servo write module configured to:
while writing a servo pattern on a machine readable medium rotating about the spindle,
    i) record, over time, a plurality of time stamps associated with a characteristic of a back electromotive force signal generated as the machine readable medium rotates about the spindle, wherein the characteristic of the back electromotive force signal repeats over the time that the plurality of time stamps are recorded, and wherein the characteristic of the back electromotive force signal is expected to repeat at expected times over the time that the plurality of time stamps are recorded,
    ii) perform a comparison of one or more of the plurality of time stamps with one or more of the expected times that the characteristic of the back electromotive force signal is expected to repeat,
    iii) based upon the comparison, detect a timing error associated with writing the servo pattern on the machine readable medium, and iv) based on the timing error, re-write at least a part of the servo pattern that was previously written on the machine readable medium.

7. The self-servo write controller of claim 6, wherein the self-servo write module is further configured to detect the timing error by detecting when a variation between (i) the one or more of the plurality of time stamps and (ii) the one or more of the expected times that the characteristic of the back electromotive force signal is expected to repeat exceeds a predetermined threshold.

8. The self-servo write controller of claim 6, wherein the self-servo write module is further configured to record the plurality of time stamps by latching the plurality of time stamps using a reference clock controlled by a phase locked loop.

9. The self-servo write controller of claim 6, wherein the self-servo write module is further configured to adjust, based on the timing error, the writing of the servo pattern on the machine readable medium by applying, based on the timing error, a timing correction to a reference clock locked to the servo pattern on the machine readable medium.

10. The self-servo write controller of claim 6, wherein the self-servo write module is configured to write the servo pattern on the machine readable medium by writing a spiral-based positioning pattern on a platter, wherein the spiral-based positioning pattern is configured to control an actuator while a final positioning pattern is written on the platter.

11. A self-servo write system comprising:
a spindle;
a machine readable medium configured to rotate about the spindle; and
a self-servo write controller including a self-servo write module, wherein the self-servo write module is configured to
while writing a servo pattern on the machine readable medium rotating about the spindle,
  i) record, over time, a plurality of time stamps associated with a characteristic of a back electromotive force signal generated as the machine readable medium rotates about the spindle, wherein the characteristic of the back electromotive force signal repeats over the time that the plurality of time stamps are recorded, and wherein the characteristic of the back electromotive force signal is expected to repeat at expected times over the time that the plurality of time stamps are recorded,
  ii) perform a comparison of one or more of the plurality of time stamps with one or more of the expected times that the characteristic of the back electromotive force signal is expected to repeat,
  iii) based upon the comparison, detect a timing error associated with writing the servo pattern on the machine readable medium, and
  iv) based on the timing error, re-write at least a part of the servo pattern that was previously written on the machine readable medium.

12. The self-servo write system of claim 11, wherein the self-servo write module is further configured to detect the timing error by detecting when a variation between (i) the one or more of the plurality of time stamps and (ii) the one or more of the expected times that the characteristic of the back electromotive force signal is expected to repeat exceeds a predetermined threshold.

13. The self-servo write system of claim 11, wherein the self-servo write module is further configured to record the plurality of time stamps by latching the plurality of time stamps using a reference clock controlled by a phase locked loop.

14. The self-servo write system of claim 11, wherein the self-servo write module is further configured to adjust, based on the timing error, the writing of the servo pattern on the machine readable medium by applying, based on the timing error, a timing correction to a reference clock locked to the servo pattern on the machine readable medium.

15. The self-servo write system of claim 11, wherein the self-servo write module is configured to write the servo pattern on the machine readable medium by writing a spiral-based positioning pattern on a platter, wherein the spiral-based positioning pattern is configured to control an actuator while a final positioning pattern is written on the platter.

\* \* \* \* \*